(12) United States Patent
Kawaguchi et al.

(10) Patent No.: US 6,229,568 B1
(45) Date of Patent: *May 8, 2001

(54) AUTOMATIC FOCUS CONTROL METHOD AND APPARATUS

(75) Inventors: Naoki Kawaguchi; Makibi Nakamura, both of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/668,751

(22) Filed: Jun. 24, 1996

(30) Foreign Application Priority Data

Jun. 30, 1995 (JP) .................. 07-188229

(51) Int. Cl.⁷ .................. H04N 5/232
(52) U.S. Cl. .................. 348/350; 348/345
(58) Field of Search .................. 348/345, 350, 348/352, 353, 354, 346, 348, 349, 355, 356, 170, 169; 396/80

(56) References Cited

U.S. PATENT DOCUMENTS

| | | | |
|---|---|---|---|
| 4,591,257 * | 5/1986 | Sawano .................. | 396/148 |
| 5,003,339 * | 3/1991 | Kikuchi et al. .................. | 348/347 |
| 5,051,766 * | 9/1991 | Nonaka et al. .................. | 396/103 |
| 5,093,716 * | 3/1992 | Kondo et al. .................. | 348/229 |
| 5,128,768 * | 7/1992 | Suda et al. .................. | 348/352 |
| 5,138,357 * | 8/1992 | Utagawa .................. | 396/96 |
| 5,258,847 * | 11/1993 | Yamada et al. .................. | 348/227 |
| 5,353,089 * | 10/1994 | Yaji .................. | 348/356 |
| 5,355,163 * | 10/1994 | Tomitaka .................. | 348/234 |
| 5,369,430 * | 11/1994 | Kitamura .................. | 348/94 |
| 5,422,671 * | 6/1995 | Yamada et al. .................. | 348/345 |
| 5,422,673 * | 6/1995 | Kondo et al. .................. | 348/352 |
| 5,534,923 * | 7/1996 | Suda .................. | 348/354 |
| 5,589,911 * | 12/1996 | Nonaka .................. | 396/80 |
| 5,629,735 * | 5/1997 | Kaneda et al. .................. | 348/345 |

FOREIGN PATENT DOCUMENTS

6018271 * 1/1986 (JP) .................. H04N/5/232

* cited by examiner

Primary Examiner—Wendy R. Garber
Assistant Examiner—Aung S. Moe
(74) Attorney, Agent, or Firm—Jay H. Maioli (57) ABSTRACT

An automatic focus control method and apparatus are capable of correctly controlling the focus even when an object having a high contrast enters or leaves goes out from a distance measurement frame during the focusing operation. A control microcomputer monitors the detecting position of the focusing signal generated by an automatic focus detection circuit. If the control microcomputer concludes that the detecting position of the focusing signal is in a peripheral area of the distance measurement frame, the control microcomputer outputs a distance measurement frame control signal to change the location or the size of the distance measurement frame so that an object having a high contrast no longer either enters or goes out from the distance measurement frame.

6 Claims, 14 Drawing Sheets

FIG. 3B
LUMINANCE
SIGNAL

FIG. 3C
HPF OUTPUT

FIG. 3D
RECTIFIED
OUTPUT

FIG. 3E
GATING SIGNAL

FIG. 3F

VALUES OF COUNT 1 AND COUNT 2
ARE STORED (UPDATED) WHEN
THE MAXIMUM VALUE IS UPDETED

[1] EXPAND THE DISTANCE MEASUREMENT FRAME

[2] REDUCE THE SIZE OF THE DISTANCE MEASUREMENT FRAME

[3] CHANGE THE LOCATION OF THE DISTANCE MEASUREMENT FRAME

FIG. 6

[1] IN GOOD FOCUS

[2] IN MEDIUM DEFOCUS

[3] IN GREAT DEFOCUS

[1] IN GOOD FOCUS

[2] IN MEDIUM DEFOCUS

[3] IN GREAT DEFOCUS

FIG. 16
(PRIOR ART)

AUTOMATIC FOCUS CONTROL METHOD AND APPARATUS

BACKGROUND OF THE INVENTION

1. Field of the Invention

The present invention relates to a technique of automatic focus control of an image pick-up apparatus such as a video tape recorder integrated with a camera (hereafter referred to as a "camcorder"), and more particularly, to a technique for preventing an incorrect operation in the automatic focus control.

2. Description of the Related Art

Figure 11:
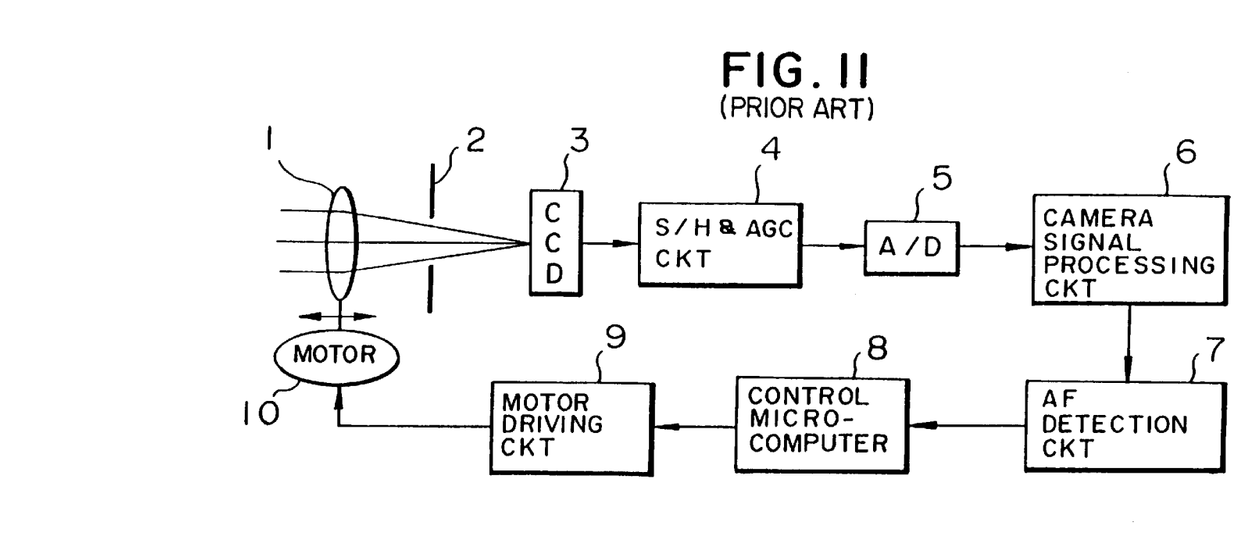
FIG. 11 is a block diagram illustrating the basis construction of a conventional automatic focus control apparatus.

FIG. 11 illustrates an example of an automatic focus control apparatus of an image pick-up apparatus such as a camcorder. In FIG. 11, light from an object (not shown) is focused by a focusing lens 1 onto a CCD image sensing device 3 so that an image of the object is formed on the CCD image sensing device 3. The amount of light falling onto CCD image sensing device 3 is adjusted by an iris 2 to a proper value. The CCD image sensing device 3 converts the optical image into a video signal which is then transmitted to a sample-and-hold and AGC circuit 4. In the sample-and-hold and AGC circuit 4, noise is removed from the video signal and the signal level of the video signal is adjusted to a proper value. The video signal is then converted by an analog-to-digital converter 5 into a digital signal. The video signal converted in the digital form is subjected to camera signal processing such as Y/C separation, gamma correction, etc., in a camera signal processing circuit 6. The output signal of the camera signal processing circuit 6 is transmitted to a recording/reproducing circuit (not shown) and is subjected to recording/reproducing processing. The camera signal processing circuit 6 extracts a luminance signal from the video signal and transmits the resultant luminance signal to an automatic focus detection circuit 7.

Figure 12:
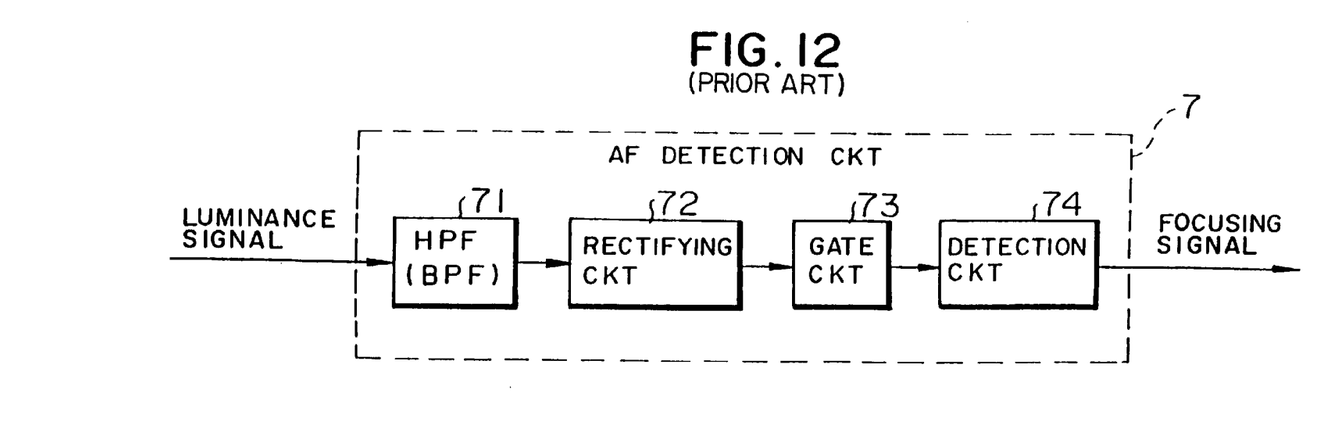
FIG. 12 is a block diagram illustrating the construction of a conventional automatic focus detection circuit.

As shown in FIG. 12, the automatic focus detection circuit 7 includes: a high-pass filter 71 for passing high-frequency components of the luminance signal (or a band-pass filter); a rectifying circuit 72 for rectifying the output of the filter 71; a gate circuit 73 for extracting a luminance signal within a distance measurement frame from the output of the rectifying circuit 72 wherein the extracted luminance signal is used in the automatic focusing operation; and a detection circuit 74 for detecting a maximum value of the high-frequency components within a field from the output of the gate circuit 73 thereby generating a focusing signal.

Figure 13:
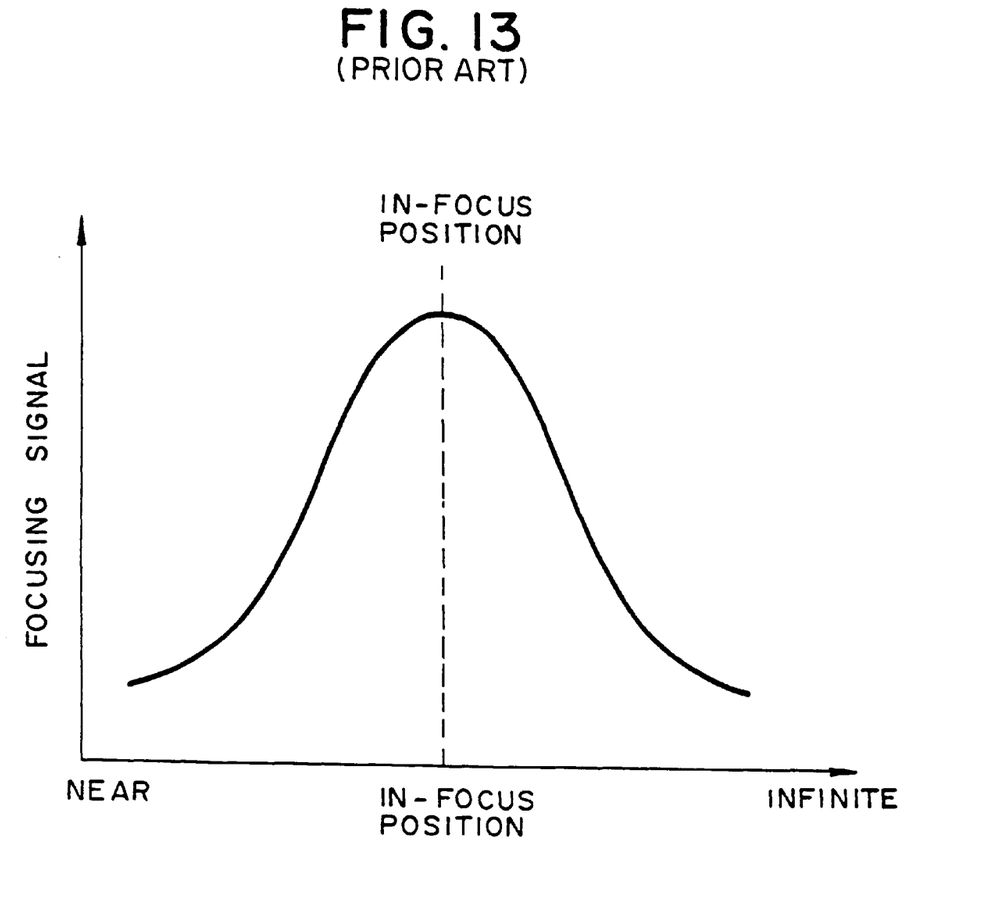
FIG. 13 is a graph illustrating an example of a focusing signal generated by the conventional automatic focus control apparatus as a function of the focusing position.

FIG. 13 illustrates a typical focusing signal generated by the automatic focus detection circuit 7 shown in FIG. 12 as a function of the focusing position. As shown in FIG. 13, the level of the focusing signal has a peak value at the best focus position.

Referring again to FIG. 11, the focusing signal generated by the automatic focus detection circuit 7 is transmitted to a control microcomputer 8. The control microcomputer 8 transmits a motor control signal to a motor driving circuit 9 so that the focusing lens 1 is moved in a direction which results in an increase in the level of the focusing signal. In response to the motor control signal, the motor driving circuit 9 drives a motor 10 so that it rotates in a direction and at a speed indicated by the motor control signal. That is, a closed loop is formed in the circuit so that the focusing lens 1 is moved to a location at which the level of the focusing signal has a peak value. In the above technique of automatic focus control, the peak of the focusing signal is searched for, and thus this technique is called hill-climbing control.

In the above hill-climbing control, however, when the contrast of the object within the distance measurement frame is rather low, if there is an object having a high contrast outside the distance measurement frame, there is a possibility that it may become unable to correctly control the focusing. The above problem will be described in greater detail below with reference to FIGS. 14 to 16.

Figure 14:
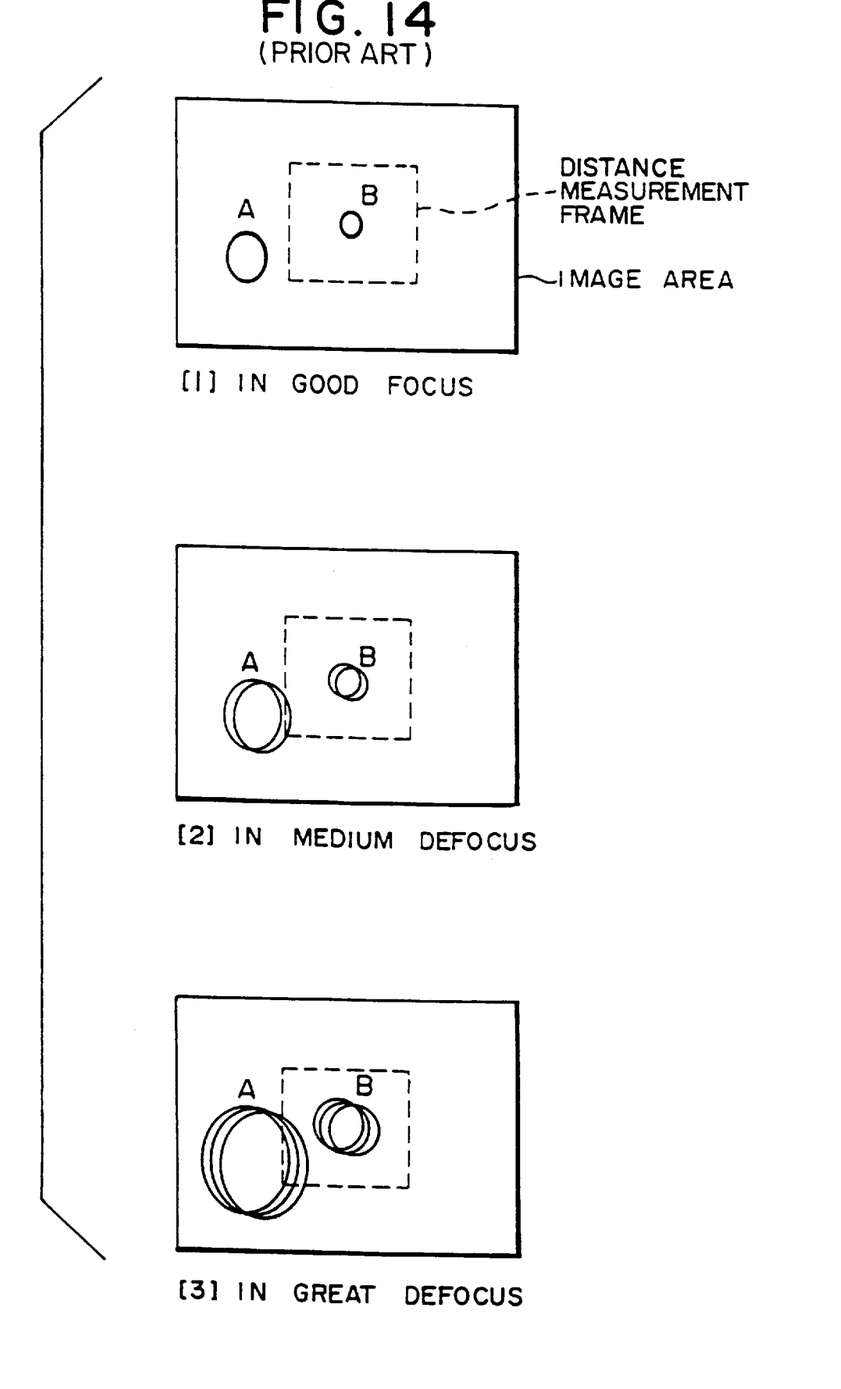
FIG. 14 is a schematic diagram illustrating objects and a distance measurement frame for three different focusing states, a best focus state 2, modestly defocused state, and a highly defocused state.

FIG. 14 illustrates three different focusing states: a best focus state; modestly defocused states 2; and a highly defocused state. In FIG. 14, the object A present outside the distance measurement frame has a higher contrast than the object B present in the distance measurement frame. In the best focus state shown in FIG. 14(1), the object A is completely outside the distance measurement frame, and the object B is completely inside the distance measurement frame. In the modestly defocused state shown in FIG. 14(2), the outline of the object A is blurred, and a part of the blurred image (a circle of confusion) comes in contact with the periphery of the distance measurement frame. In the greatly defocused state shown in FIG. 14(3), a part of the blurred image of the object A comes into the distance measurement frame.

Figure 15:
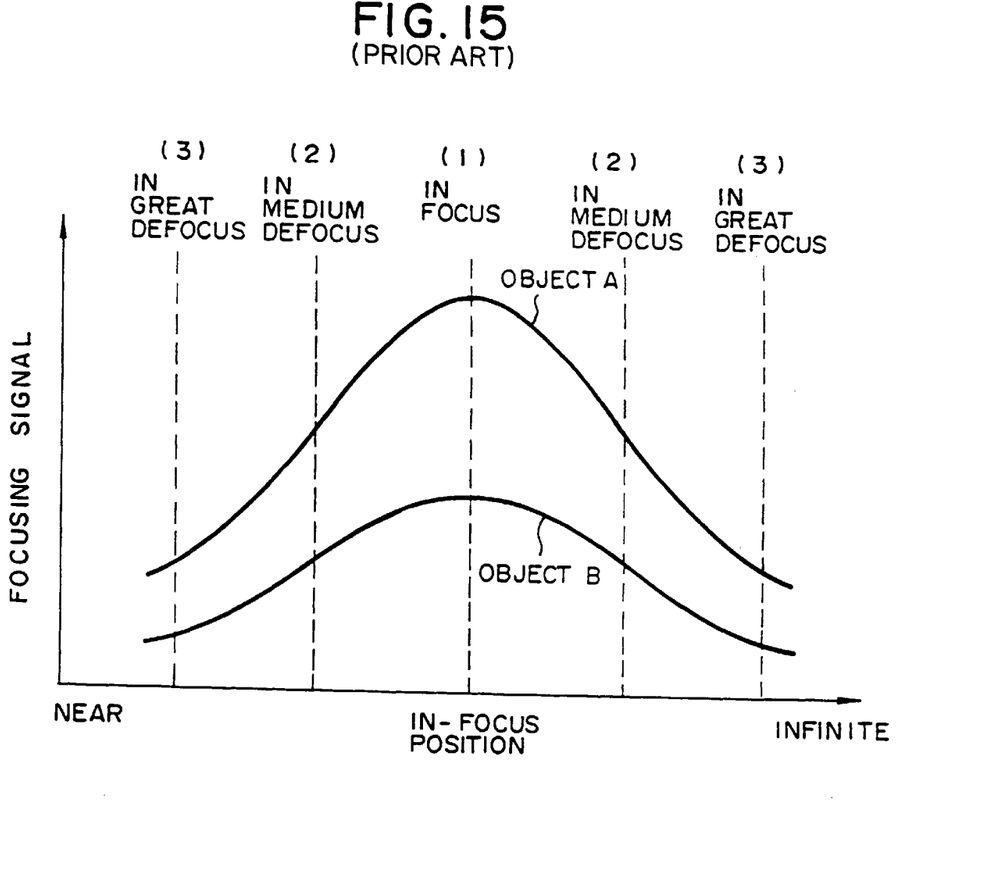
FIG. 15 is a graph illustrating the focusing signals associated with objects A and B shown in FIG. 14 as a function of the focusing position.
Figure 16:
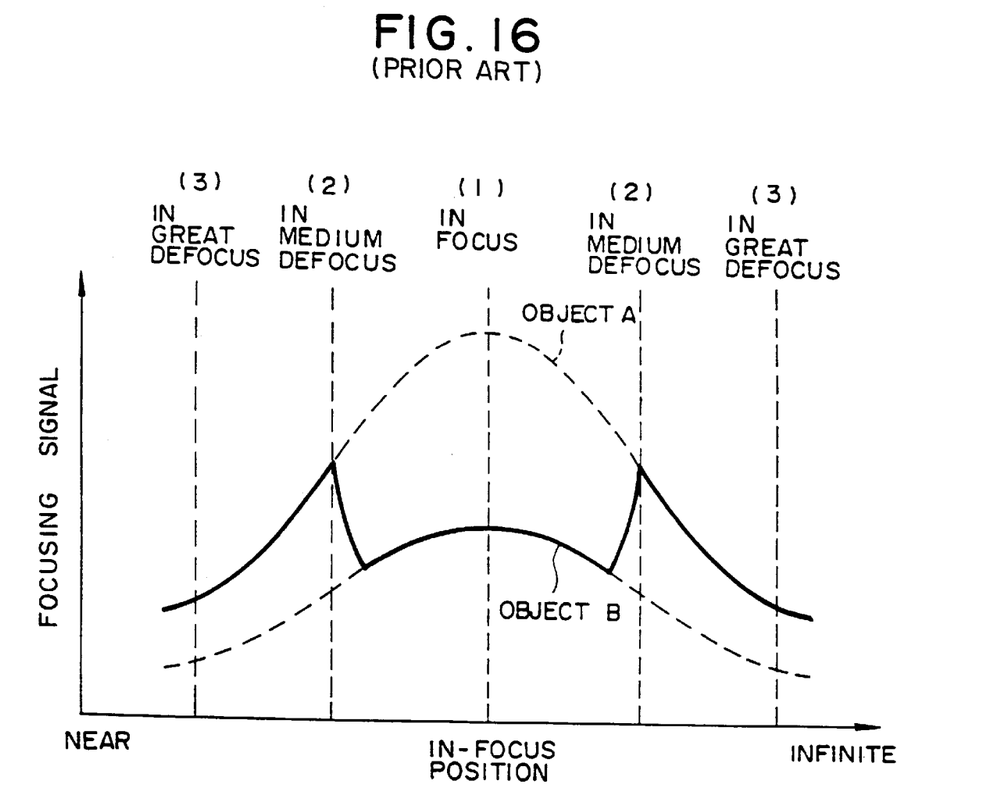
FIG. 16 is a graph illustrating the focusing signal within the distance measurement frame as a function of the focusing position.

If the objects A and B are equally apart from the image pick-up apparatus, the focusing signals associated with the objects A and B change with the position of the focusing lens as shown in FIG. 15. In this case, the focusing signal within the distance measurement frame changes in such a fashion as shown in FIG. 16.

Since the focusing signal is given for a portion detected as having the highest contrast within the distance measurement frame, the edge of the object A is detected in the greatly defocused state (3) or in the modestly defocused state (2). However, the focusing signal in connection with the object A decreases abruptly as the focusing state goes to a better state from the modestly defocused state (2) and thus the edge of the object A goes to the outside of the distance measurement frame. Finally, the edge of the object B is detected, and thus the focusing signal comes to be given for the object B. As a result, the focusing signal has a peak when the blurred edge of the object A located outside the distance measurement frame goes out of the distance measurement frame. This means that the focusing signal has a peak in the modestly defocused state (2), and the position corresponding to that peak is incorrectly regarded as a best focus position. Therefore, the true best focus position cannot be reached.

As described above, in the conventional automatic focus control technique in which the focus control operation is performed by searching for a peak in the focusing signal, if the contrast of an object within the distance measurement frame is rather low and if there is an object having a high contrast outside the distance measurement frame, a blurred edge portion of an object located outside the distance measurement frame can partially enter the distance measurement frame as a result of expansion of the image in a defocused state, and thus it becomes impossible to reach a correct focused state.

In view of the above problems, it is an object of the present invention to provide a method and apparatus for automatically controlling the focus by which a correct focused state can be obtained even when an object having a high contrast is present adjacent to the distance measurement frame.

SUMMARY OF THE INVENTION

According to an aspect of the present invention there is provided an automatic focus control apparatus which generates a focusing signal from a predefined frequency component of a video signal obtained by taking an image of an object, the apparatus comprising: first means for detecting that the detecting position of the focusing signal is in a peripheral area of a predefined distance measurement frame; and second means for changing the predefined distance measurement frame in response to the detection output of the first means.

The above-described first means may be detection means which detects whether the detecting position of the focusing signal is in a peripheral area of the distance measurement frame by comparing the detecting position of the focusing signal with the location of the predefined distance measurement frame. The first means may also be detection means which detects whether the detecting position of the focusing signal is in a peripheral area of the distance measurement frame by comparing frequency components within a plurality of different distance measurement frames with each other.

The above-described second means may change the size or the location of the predefined distance measurement frame.

According to another aspect of the present invention, there is provided an automatic focus control method in which a focusing signal is generated from a predefined frequency component of a video signal obtained by taking an image of an object, the method being characterized in that when it is detected that the detecting position of the focusing signal is in a peripheral area of a predefined distance measurement frame, the predefined distance measurement frame is changed.

In the automatic focus control apparatus and method according to the present invention, if the detecting position of the focusing signal generated from a predefined frequency component of a video signal obtained by taking an image of an object is regarded as being in a peripheral area of the predefined distance measurement frame, the location or the size of the distance measurement frame is changed so as to prevent an incorrect operation in the automatic focusing control.

DESCRIPTION OF THE PREFERRED EMBODIMENTS

With reference to preferred embodiments, the present invention will be described below in connection with the accompanying drawings. In particular, the following items will be discussed in great detail.

1. Basic construction of the automatic focus control apparatus according to the invention.

2. Means for detecting whether the detecting position of the focusing signal is in a peripheral area of the distance measurement frame.

2.1 Detection based on comparison between the detecting position of the focusing signal and the location of the distance measurement frame.

2.2 Detection based on comparison among focusing signals of a plurality of different distance measurement frames.

1. Basic construction of an automatic focus control apparatus according to the present invention.

Figure 1:
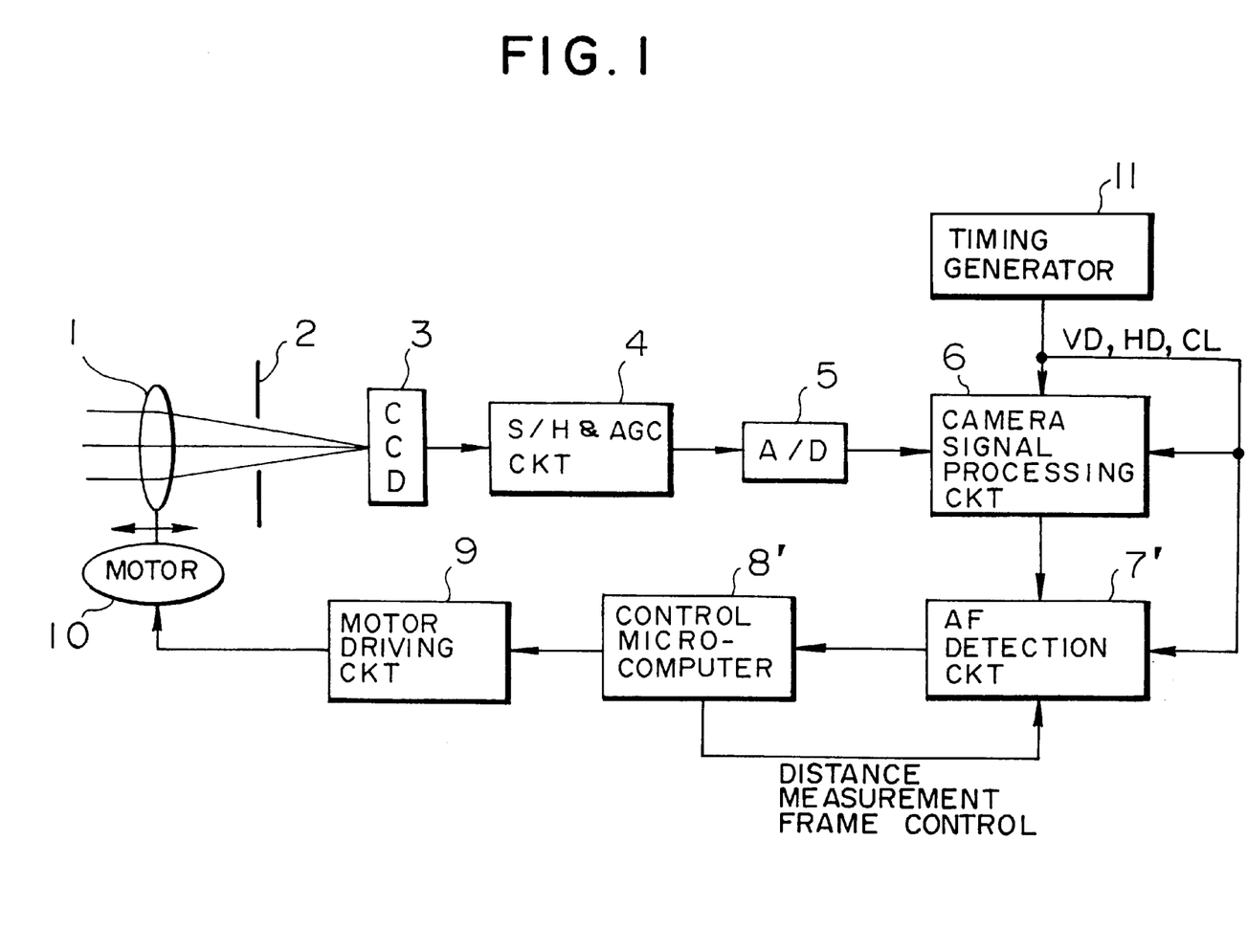
FIG. 1 is a block diagram illustrating the basic construction of an automatic focus control apparatus according to an embodiment of the present invention.

FIG. 1 is a block diagram illustrating the basic construction of an automatic focus control apparatus according to the present invention. In this figure, similar elements or portions to those in FIG. 11 are denoted by similar reference numbers.

The automatic focus control apparatus according to the present invention includes: a focusing lens for focusing light from object (not shown) 1; an iris 2 for adjusting the amount of light emerging from the focusing lens 1; a CCD image sensing device 3 for converting the object's image formed by the light passing through the iris 2 into a video signal; a sample-and-hold and AGC circuit 4 for removing noise from the video signal output by the CCD image sensing device 3 and also adjusting the level of the video signal; an analog-to-digital converter 5 for converting the output of the sample-and-hold and AGC circuit 4 into a digital signal; and a camera signal processing circuit 6 for performing signal processing such as Y/C separation and gamma correction on the digital signal output by the analog-to-digital converter 5.

The automatic focus control apparatus according to the present invention further includes: an automatic focus detection circuit 7' for generating a focusing signal used in automatic focus control operation from the luminance signal extracted by the camera signal processing circuit 6; a control microcomputer 8' which transmits a motor control signal to a motor driving circuit 9 so as to drive the focusing lens 1 in a direction which results in an increase in the level of the focusing signal output by the automatic focus detection circuit 7' and which transmits a distance measurement frame control signal to the automatic focus detection circuit 7' so as to control the location and the size of the distance measurement frame when the detecting position of the focusing signal is regarded as being in a peripheral area of the distance measurement frame; a motor driving circuit 9 for driving a motor 10 in response to a motor control signal received from the control microcomputer 8'; a motor 10 driven by the motor driving circuit 9 so as to move the focusing lens 1; and a timing generator 11 for supplying a vertical synchronizing signal VD, a horizontal synchronizing signal HD, and a clock signal CL of a frequency of for example 14 MHz to the camera signal processing circuit 6 and the automatic focus detection circuit 7'.

The operation of the apparatus shown in FIG. 1 will be described below. In FIG. 1, light from an object (not shown) is focused onto the CCD image sensing device 3 by the focusing lens 1 via the iris 2 so that an optical image of the object is formed on the CCD image sensing device 3 wherein the amount of light falling onto the CCD image sensing device 3 is adjusted by the iris 2 to a proper value. The CCD image sensing device 3 converts the optical image into a video signal which is then transmitted to the sample-and-hold and AGC circuit 4. In the sample-and-hold and AGC circuit 4, noise is removed from the video signal and the signal level of the video signal is adjusted to a proper value. The video signal is then converted by the. analog-to-digital converter 5 into a digital signal. The video signal converted in the digital form is subjected to camera signal processing such as Y/C separation, gamma correction, etc., in the camera signal processing circuit 6. The output signal of the camera signal processing circuit 6 is transmitted to a recording/reproducing circuit (not shown) and is subjected to recording/reproducing processing. The camera signal processing circuit 6 extracts a luminance signal from the video signal and transmits the resultant luminance signal to an automatic focus detection circuit 7'.

The automatic focus detection circuit 7' generates a focusing signal on the basis of the luminance signal supplied by the camera signal processing circuit 6 and the vertical synchronizing signal VD, the horizontal synchronizing signal HD, and the clock signal CL supplied by the timing generator 11, and transmits the resultant focusing signal to the control microcomputer 8'. The control microcomputer 8' generates a motor control signal and transmits it to the motor driving circuit 9 so as to move the focusing lens 1 in a direction which results in an increase in the focusing signal. In response to the motor control signal, the motor driving circuit 9 drives the motor 10 so that it rotates in a direction and at a speed indicated by the motor control signal. Furthermore, the control microcomputer 8' determines whether the detecting position of the focusing signal is in a peripheral area of the distance measurement frame. If it is, then the control microcomputer 8' transmits a distance measurement frame control signal to the automatic focus detection circuit 7' so as to change the location or the size of the distance measurement frame (as will be described in greater detail later).

2. Means for detecting whether the detecting position of the focusing signal is in a peripheral area of the distance measurement frame.

The present invention provides two different means for detecting whether the detecting position of the focusing signal is in a peripheral area of the distance measurement frame. In the first means, the detection is performed by comparing the detecting position of the focusing signal with the location of the distance measurement frame. In the other means, focusing signals detected for a plurality of different distance measurement frames are compared with each other. These two means will be described in greater detail below.

2.1 Detection based on comparison between the detecting position of the focusing signal and the location of the distance measurement frame.

Figure 2:
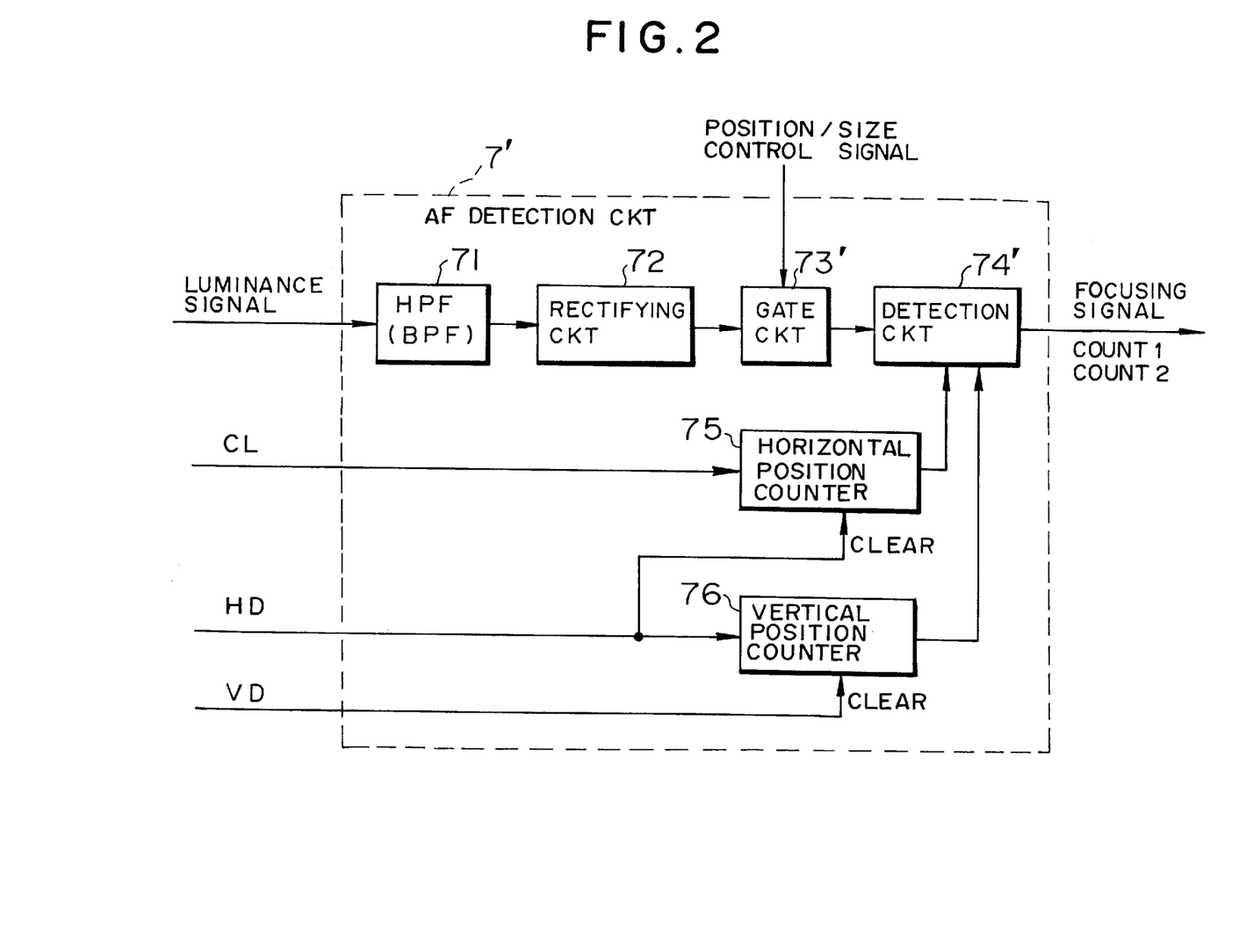
FIG. 2 is a block diagram illustrating an example of the construction of the automatic focus detection circuit shown in FIG. 1.
Figure 3A:
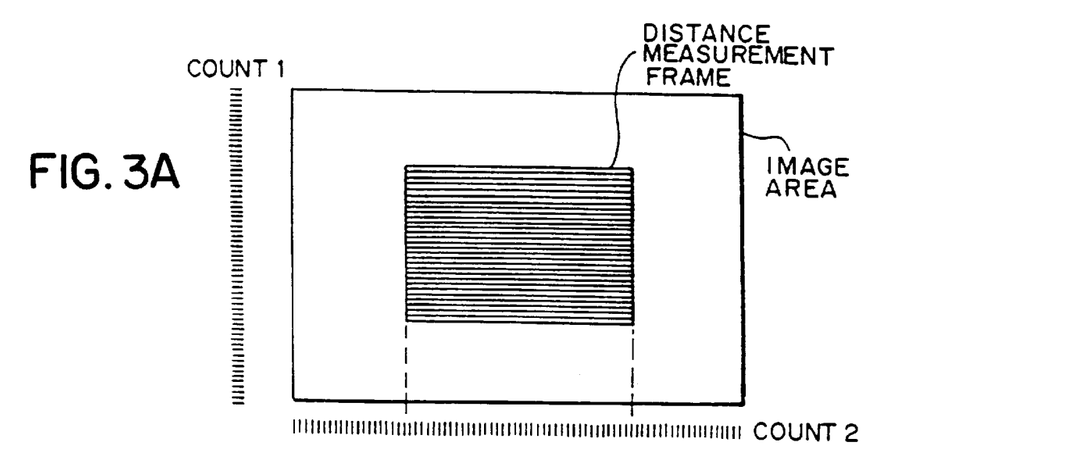
FIG. 3 is a schematic diagram illustrating the operation of the automatic focus detection circuit shown in FIG. 2.
Figure 3B:
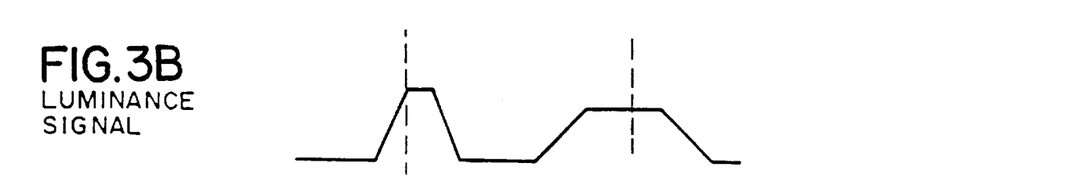
Figure 3C:
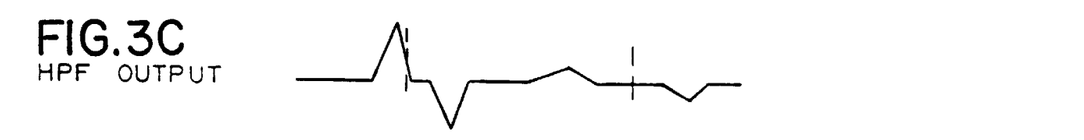
Figure 3D:
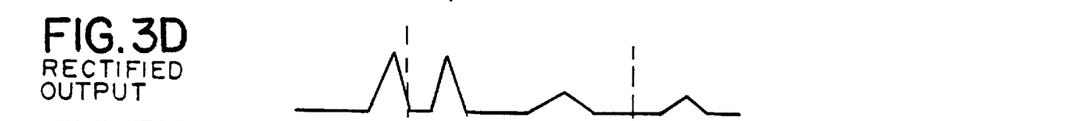
Figure 3E:
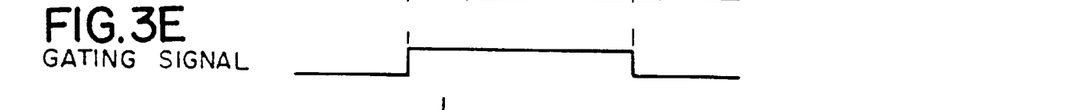
Figure 3F:
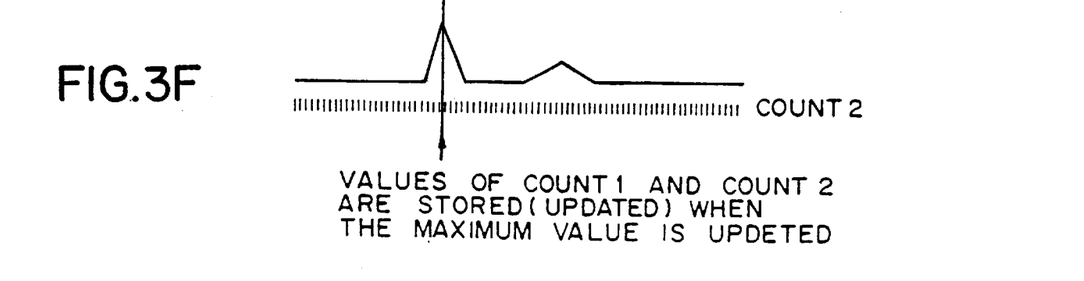

FIG. 2 is a block diagram illustrating the construction of the automatic focus detection circuit 7'. In this figure, similar elements or portions to those in FIG. 12 are denoted by similar reference numbers.

As shown in FIG. 2, the automatic focus detection circuit 7' includes: a high-pass filter 71 for passing high-frequency components of the luminance signal (or a band-pass filter); a rectifying circuit 72 for rectifying the output of the filter 71; a gate circuit 73' for extracting a luminance signal within a distance measurement frame from the output of the rectifying circuit 72 wherein the automatic focusing operation is performed on the basis of the extracted luminance signal; and a detection circuit 74' which detects a maximum value of the high-frequency components within a field from the output of the gate circuit 73' thereby generating a focusing signal, and which holds values counted by a horizontal position counter 75 and a vertical position counter 76 which will be described later at a time when the above focusing signal is detected, wherein the gate circuit 73' is connected to the control microcomputer 8' so that the gate circuit 73' can receive a control signal indicating the location and size of the distance measurement frame. If the control microcomputer has determined that the detecting position of the focusing signal is in a peripheral area of the distance measurement frame, then the control microcomputer generates a control signal so as to change the location or the size of the distance measurement frame, thereby preventing an incorrect operation in the automatic focus control (as will be described in greater detail later).

The automatic focus detection circuit 7' further includes: a horizontal position counter 75 which is incremented each time a clock signal CL is supplied to it from the timing generator 11 and which is cleared each time a horizontal synchronizing signal HD is applied to the horizontal position counter 75; and a vertical position counter 76 which is incremented by the horizontal synchronizing signal HD and which is cleared each time a vertical synchronizing signal VD is applied to the vertical position counter 76. The value counted by the vertical position counter 76 is transmitted as a count 1 to the detection circuit 74' and the value counted by the horizontal position counter 75 is transmitted as a count 2 to the detection circuit 74'.

With reference to FIG. 3, the operation of the automatic focus detection circuit 7' shown in FIG. 2 will be described below. FIG. 3(1) illustrates the relationship among the image area, the distance measurement frame, the count 1, and the count 2. If it is assumed here that a luminance signal such as that shown in FIG. 3(2) is applied to the automatic focus detection circuit, the automatic focus detection circuit responds as follows. In this specific example, there is an object having a high contrast at a location near the left side of the distance measurement frame and there is another object having a low contrast at a location near the right side of the distance measurement frame.

The high-pass filter (or band-pass filter) 71 extracts high-frequency components from the luminance signal applied to the automatic focus detection circuit. FIG. 3(3) illustrates the extracted high-frequency components. The high-frequency components are rectified by the rectifying circuit 72 as shown in FIG. 3(4). The rectified signal within the AF distance measurement frame is extracted in response to a gating signal shown in FIG. 3(5). The detection circuit 74' detects a maximum value within the distance measurement frame and outputs the resultant value as the focusing signal.

Each time the horizontal position counter 75 receives a horizontal synchronizing signal HD, the horizontal position counter 75 starts counting the clock signal which is supplied by the timing generator 11 at a frequency of about 14 MHz, and transmits the counted value, "count 2", to the detection circuit 74'. Similarly, each time the vertical position counter 76 receives a vertical synchronizing signal VD, the vertical position counter 76 starts counting the horizontal synchronizing signal HD supplied by the timing generator 11, and transmits the counted value, "count 1", to the detection circuit 74'.

On the other hand, the detection circuit 74' latches the values of count 1 and count 2 each time the maximum value of the output of the rectifying circuit 72 is updated. As a result, the detection circuit 74' holds the level of the focusing signal in each field and the values of count 1 and count 2 which are given at the time when the above level of the focusing signal is detected. The level of the focusing signal and the values of count 1 and count 2 are transmitted to the control microcomputer 8'.

Figure 4:
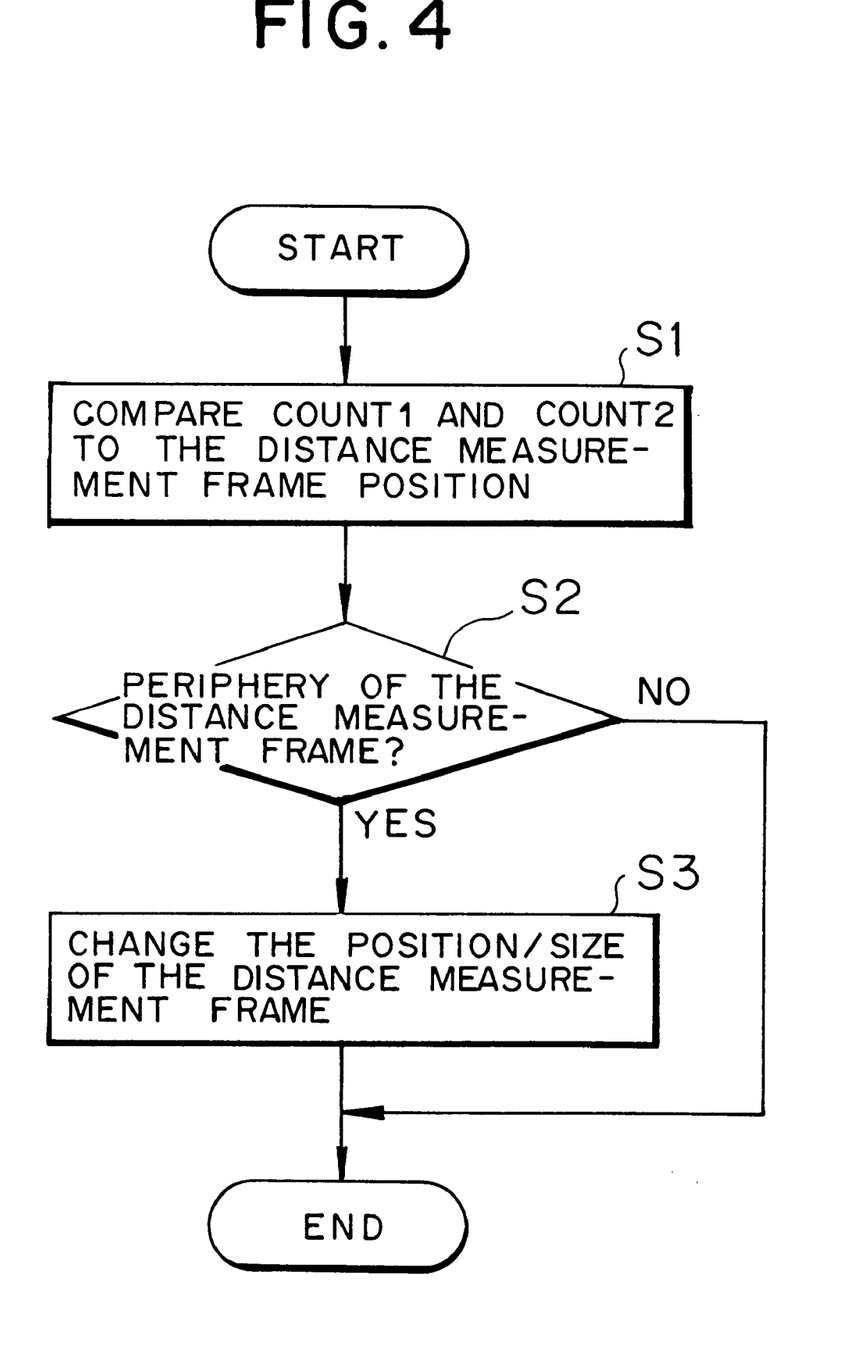
FIG. 4 is a flow chart illustrating the process performed by the control microcomputer shown in FIG. 1.

Referring to FIG. 4, the process performed by the control microcomputer 8' will be described below. First, the control microcomputer 8' compares the values of count 1 and count 2 received from the automatic focus detection circuit 7', that is, the detecting position of the focusing signal, with the location of the distance measurement frame (step S1). If at least one of the values of count 1 and count 2 indicates that the detecting position is in a peripheral area of the distance measurement frame (that is, if step S2 decides yes), the control microcomputer 8' transmits a control signal to the gate circuit 73' of the automatic focus detection circuit 7' to change the location or the size of the distance measurement frame (step S3). Then the process is terminated. On the other hand, if neither the value of count 1 nor the value of count 2 indicates that the detecting position is in a peripheral area of the distance measurement frame (that is, if step S2 decides no), the process is terminated without performing any further operation.

Figure 5:
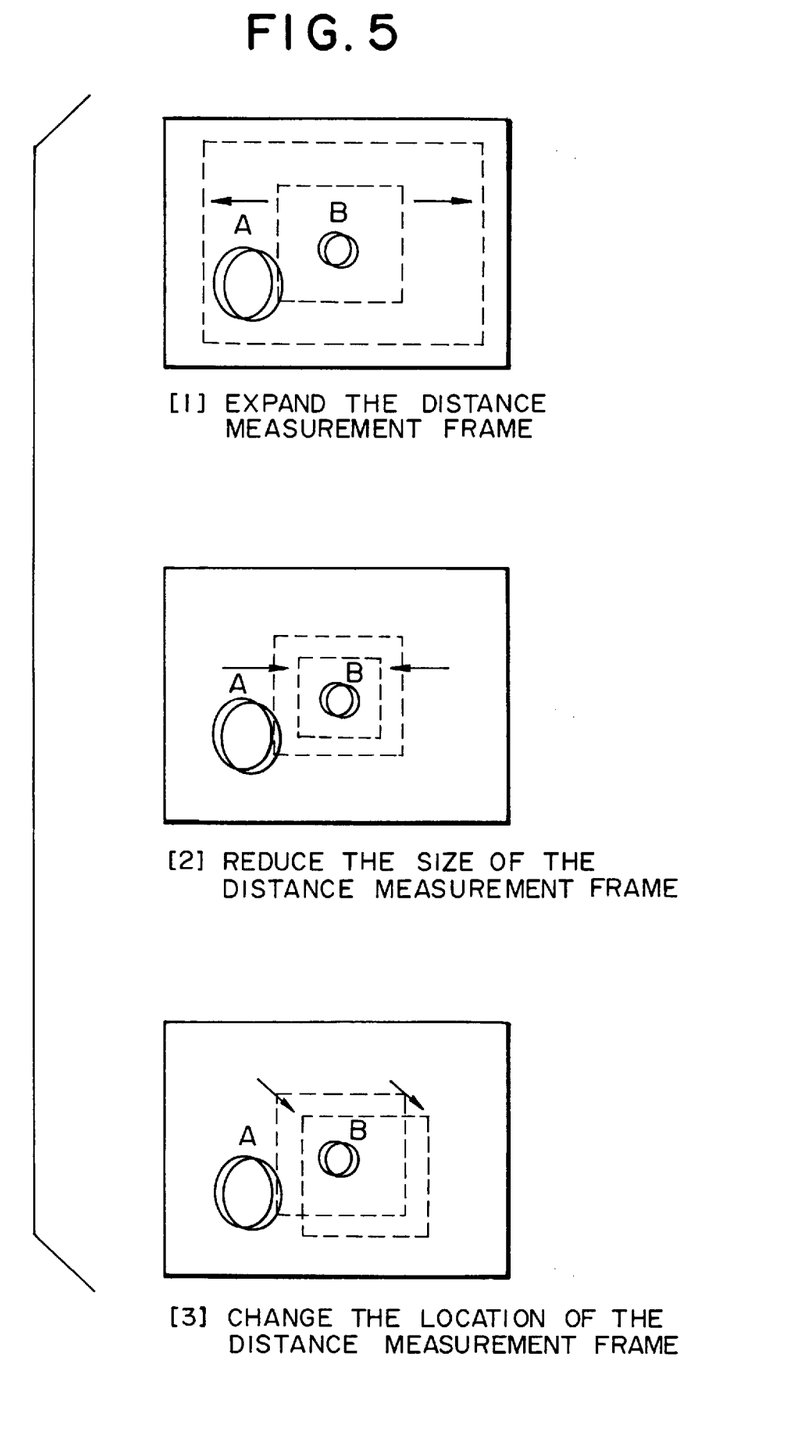
FIG. 5 is a schematic diagram illustrating examples of changes of the distance measurement frame.

FIG. 5 illustrates examples of changes of the distance measurement frame which are made when the focusing signal is detected in a peripheral area of the distance measurement frame. In FIG. 5, the object A has a relatively high contrast and the object B has a relatively low contrast.

In FIG. 5(1), the distance measurement frame is expanded so that the object A is entirely included in the distance measurement frame. If the object A is entirely included in the distance measurement frame, then the object A no longer goes out from the distance measurement frame during a process of adjusting the focus from a defocused state to a best focused state. Therefore, the focusing signal always represents the focusing state regarding the objects A and B, and thus it is possible to determine a correct direction toward the best focused state.

In the case of FIG. 5(2), the size of the distance measurement frame is reduced so that the object A is completely outside the distance measurement frame. After the reduction in the size of the distance measurement frame, the object A no longer enters the distance measurement frame during a focusing operation. As result, the focusing signal always represents the focusing state regarding the object B, and thus it is possible to determine a correct direction toward the best focused state.

In the case of FIG. 5(3), the location of the distance measurement frame is changed so that the object A does not enter the distance measurement frame. In this case, as in the case of FIG. 5(2), it is also possible to determine a correct direction toward the best focused state.

In the present invention, as described above, when the focusing signal is detected in a peripheral area of the distance measurement frame, the location or the size of the distance measurement frame is changed so as to determine a correct direction toward the best focused state.

2.2 Detection based on comparison among focusing signals of a plurality of different distance measurement frames.

Figure 6:
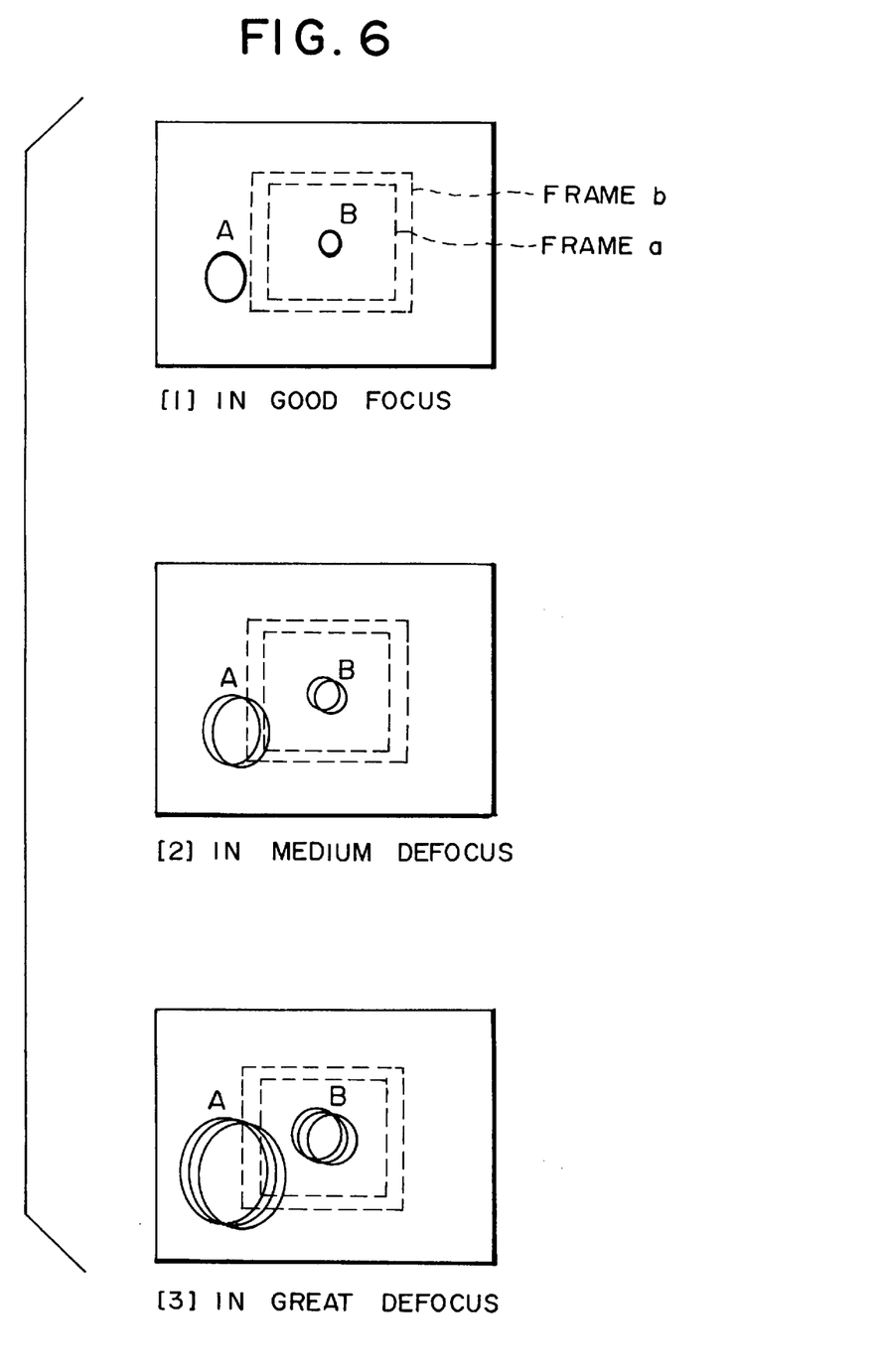
FIG. 6 is a schematic representation of the principle of determining whether the detecting position of the focusing signal is in a peripheral area of the distance measurement frame by comparing the focusing signals of a plurality of distance measurement frames having different sizes with each other.

FIG. 6 is a schematic representation of the principle of determining whether the detecting position of the focusing signal is in a peripheral area of the distance measurement frame by comparing the focusing signals of a plurality of distance measurement frames having different sizes with each other. In this specific example, a first distance measurement frame is denoted by a frame "a" and an additional distance measurement frame having a size slightly greater than that of the frame a is denoted by a frame "b". As in the case of FIG. 5, there are two objects: an object A having a high contrast; and an object B having a low contrast.

Figure 7:
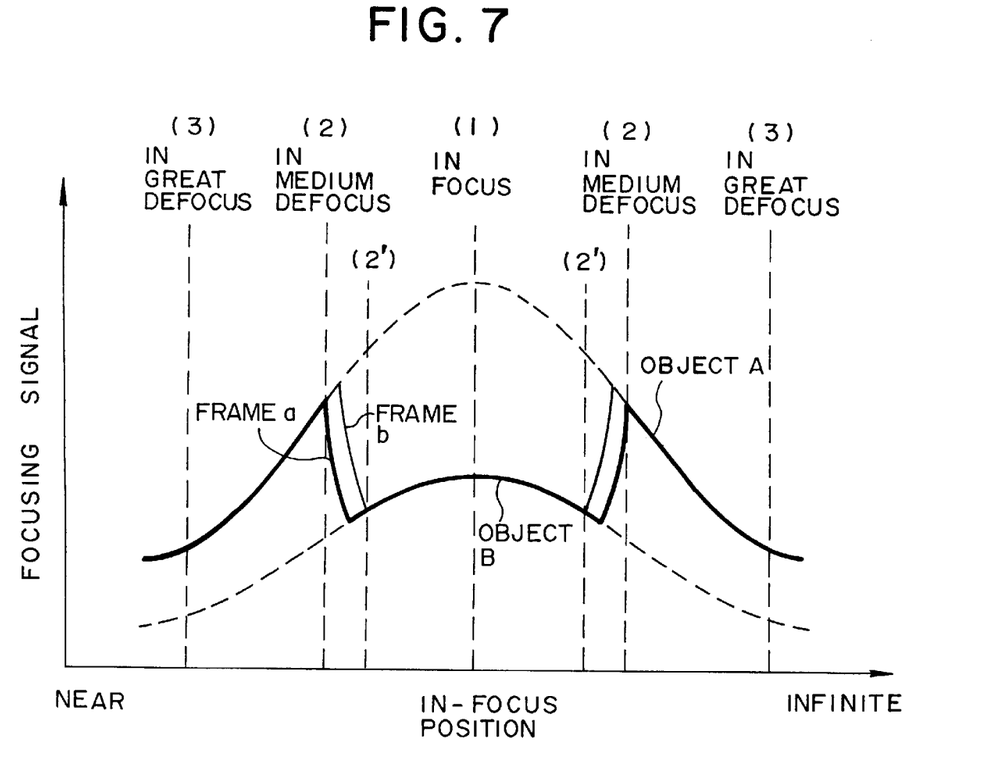
FIG. 7 is a graph illustrating the focusing signals associated with the frames a and b shown in FIG. 6 as a function of the focusing position.

FIG. 7 illustrates focusing signals associated with the frames a and b as a function of the focusing position. Since the size of the frame b is slightly greater than that of the frame a, the edge of the object A goes out from the frame b at a lens position different from the lens position at which the edge of the object A goes out from the frame a. In other words, the focusing signal associated with the frame b abruptly changes at a lens position slightly nearer to the best focus position (in-focus position) than the lens position at which the focusing signal associated with the frame a abruptly changes.

In the ranges in which the object A neither goes out from nor enters frames (between (3) and 2 and between (2') and (1)), the focusing signals associated with both frames a and b are detected at the same position, and thus the same focusing signal is obtained for both frames a and b. In these regions, it is possible to determine a correct direction toward the best focused state using the conventional technique of the automatic focus control.

On the other hand, in the range in which the object A enters or goes out from frames (between (2) and (2')), there is a difference in the detecting position of the focusing signal between the frame a and the frame b. Furthermore, the focusing signal changes very abruptly in this range. Therefore, there is a great difference in the focusing signal between the frame a and the frame b. In other words, when there is a great difference in the focusing signal between the frame a and the frame b, it is possible to conclude that the detecting position of the focusing signal is in a peripheral area of the distance measurement frame.

If a difference in the focusing signal between the frames a and b is detected, the location or the size of the distance measurement frame is changed to determine a correct direction toward the best focus position as in the case of FIG. 5.

Figure 8:
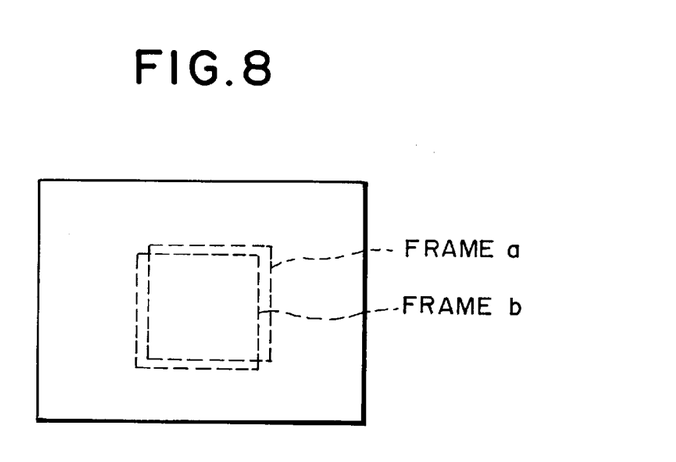
FIG. 8 is a schematic representation of the principle of determining whether the detecting position of the focusing signal is in a peripheral area of the distance measurement frame by comparing the focusing signals of a plurality of distance measurement frames at different locations with each other.

Although two frames having sizes slightly different from each other are employed in the specific example shown in FIG. 6, two frames having the same size which are located at slightly different positions as shown in FIG. 8 may also be employed. Furthermore, it is also possible to detect a transition of an object into or out of a frame by changing the location or the size of a single distance measurement frame for each field or each image frame and by performing synchronous detection on the focusing signal in synchronization with the period of the change in location or the size of signal distance measurement frame. If a greater number of frames are used in such comparison, the detection reliability can be improved further.

Figure 9:
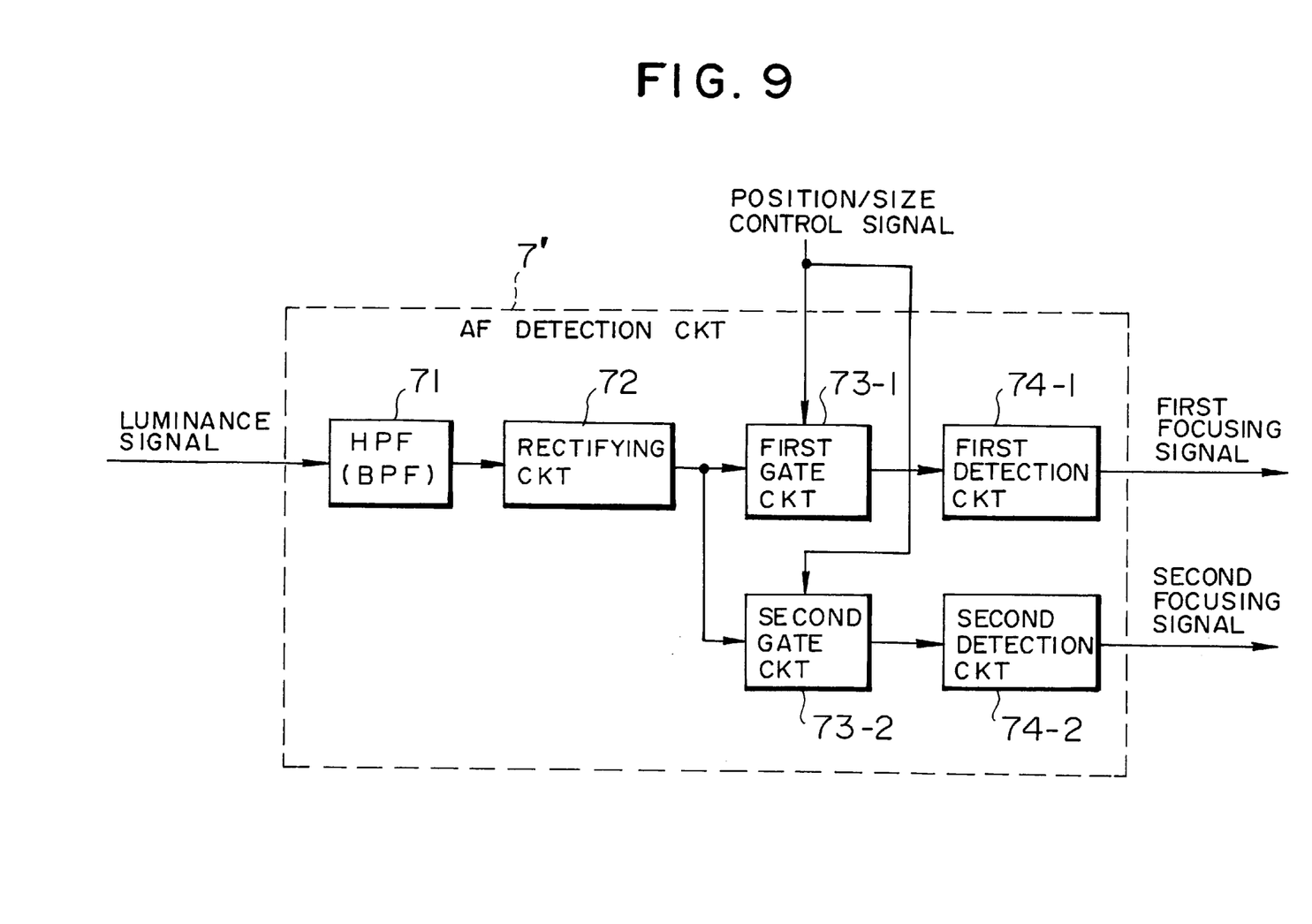
FIG. 9 is a block diagram illustrating another example of the construction of the automatic focus detection circuit.

FIG. 9 is a block diagram illustrating the construction of the automatic focus detection circuit 7'. In FIG. 9, elements similar to or corresponding to those in FIG. 2 are denoted by the same reference numerals.

As shown in FIG. 9, the automatic focus detection circuit 7' includes: a high-pass filter 71 for passing high-frequency components of the luminance signal (or a band-pass filter); a rectifying circuit 72 for rectifying the output of the filter 71; a first gate circuit 73-1 and a second gate circuit 73-2 for extracting luminance signals within distance measurement frames a and b from the output of the rectifying circuit 72; and a first detection circuit 74-1 and a second detection circuit 74-2 for detecting maximum values of high-frequency components within the distance measurement frames a and b from the outputs of the first gate circuit 73-1 and second gate circuit 73-2, thereby generating a first focusing signal and a second focusing signal, wherein the first gate circuit 73-1 and the second gate circuit 73-2 are connected to the control microcomputer 8' so that they can receive a distance measurement frame control signal according to which the locations or the sizes of the distance measurement frames are set.

Figure 10:
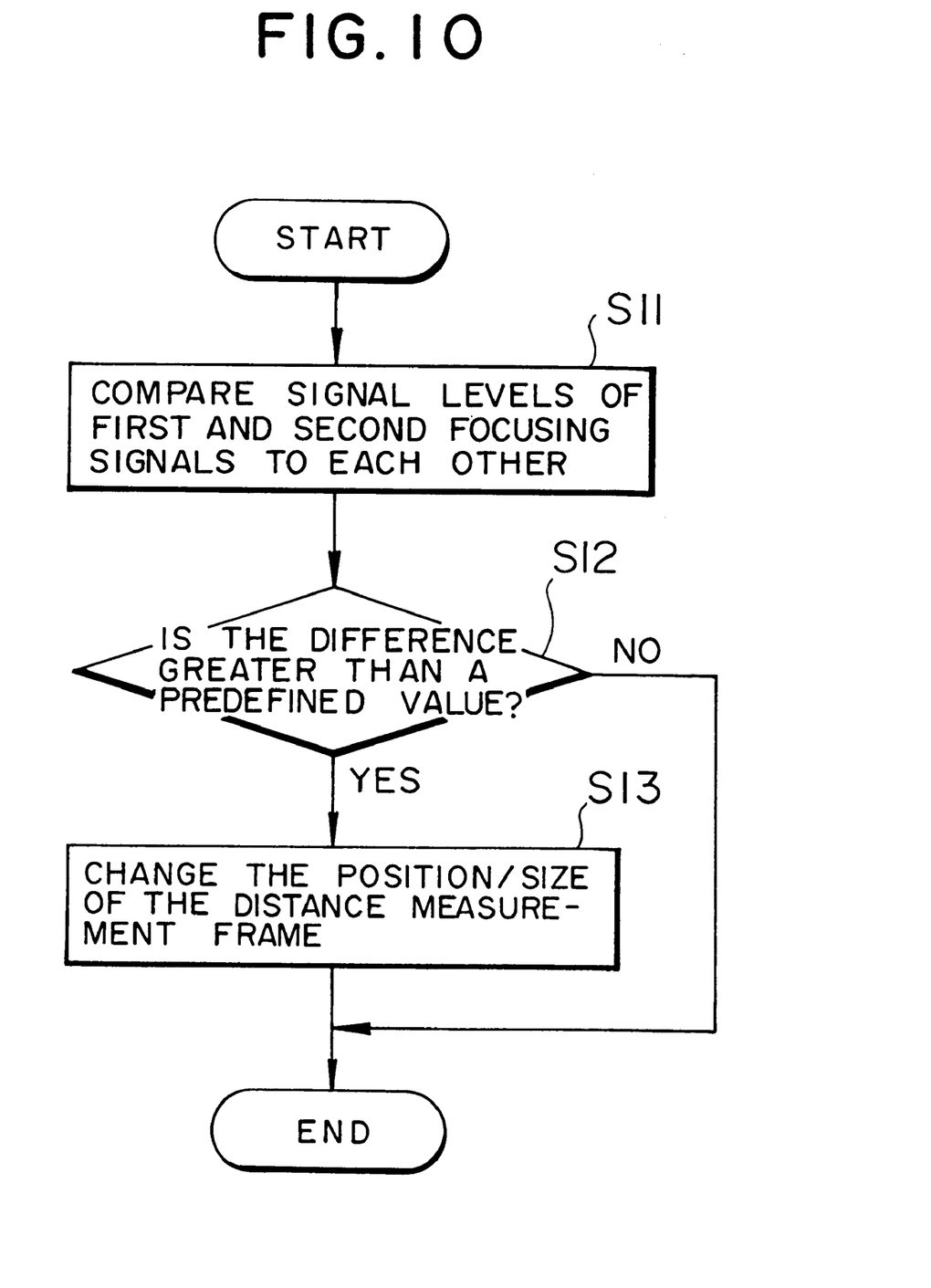
FIG. 10 is a flow chart illustrating another example of the process performed by the control microcomputer.

Referring to FIG. 10, the process performed by the control microcomputer 8' will be described below. First, the levels of the first and second focusing signals received from the automatic focus detection circuit are compared with each other (step S11). If the difference between the levels of the first and second focusing signals is greater than a predetermined value (that is, if step S12 decides yes), the control microcomputer 8' transmits a control signal to the first gate circuit 73-1 and the second gate circuit 73-2 of the automatic focus detection circuit to change the locations or the sizes of the distance measurement frames (step S13). Then the process is terminated. On the other hand, if the difference between the levels of the first and second focusing signals is not greater than a predetermined value (that is, if step S12 decides no), then the process is terminated without performing any further operation.

In the present invention, as described in detail above, if the detecting position of the focusing signal generated from a predefined frequency component of a video signal representing an image of an object is regarded as being in a peripheral area of the predefined distance measurement frame, the location or the size of the distance measurement frame is changed so as to prevent an incorrect operation in the automatic focusing control. Therefore, a correct focused state can be obtained even when an object having a high contrast enters or goes out from the distance measurement frame during the focusing operation.

What is claimed is:

1. An automatic focus control apparatus using a plurality of distance measuring frames for generating focusing signals from predefined frequency components of a video signal obtained from an image having a low contrast object and a high contrast object therein, said apparatus comprising:

means for-detecting whether an out of focus edge of said high contrast object is in said plurality of frames when focusing on said low contrast object by determining whether at least one level difference between said focusing signals exceeds a predefined value; and means for changing a position of one of said plurality of frames in response to a detection output of said means for detecting so that said out of focus edge of said high contrast object is not in said one of said plurality of frames when focusing on said low contrast object.

2. The automatic focus control apparatus according to claim 1, wherein said means for detecting includes means for comparing said predetermined frequency components within two of said plurality of frames having different sizes.

3. The automatic focus control apparatus according to claim 1, wherein said means for detecting includes means for comparing said predetermined frequency components within two of said plurality of frames located at different positions.

4. An automatic focus control apparatus using a plurality of distance measuring frames for generating focusing signals from predefined frequency components of a video signal obtained from an image having a low contrast object and a high contrast object therein, said apparatus comprising:

means for detecting whether an out of focus edge of said high contrast object is in said plurality of frames when focusing on said low contrast object by determining whether at least one level difference between said focusing signals exceeds a predefined value; and means for changing a size of one of said plurality of frames in response to a detection output of said means for detecting so that said out of focus edge of said high contrast object is not in said one of said plurality of frames when focusing on said low contrast object.

5. An automatic focus control apparatus using a plurality of distance measuring frames for generating focusing signals from predefined frequency components of a video signal obtained from an image having a low contrast object and a high contrast object therein, said apparatus comprising:

means for detecting a plurality of focusing signals corresponding to said plurality of distance measuring frames;

controlling means for detecting level differences of said focusing signals and for changing a position of one of said plurality of frames when at least one of said level differences exceeds a predetermined value so that one of said focusing signals corresponding to said one of said plurality of frames is not at a peripheral area of said one of said plurality of frames when focusing on said low contrast object.

6. An automatic focus control apparatus using a plurality of distance measuring frames for generating focusing signals from predefined frequency components of a video signal obtained from an image having a low contrast object,and a high contrast object therein, said apparatus comprising:

means for detecting a plurality of focusing signals corresponding to said plurality of distance measuring frames;

controlling means for detecting level differences of said focusing signals and for changing a size of one of said plurality of frames when at least one of said level differences exceeds a predetermined value so that one of said focusing signals corresponding to said one of said plurality of frames is not at a peripheral area of said one of said plurality of frames when focusing on said low contrast object.

* * * * *